United States Patent
Dvorak et al.

(10) Patent No.: US 8,344,282 B2
(45) Date of Patent: Jan. 1, 2013

(54) LASER WELDING OF ELECTROLYTIC CAPACITORS

(75) Inventors: Leos Dvorak, Ceska Trebova (CZ); Ales Vyroubal, Postrelmov (CZ); Rene Kalas, Ceska Trebova (CZ); Jozef Honec, Brno (CZ); Peter Honec, Brno (CZ)

(73) Assignee: AVX Corporation, Myrtle Beach, SC (US)

( * ) Notice: Subject to any disclaimer, the term of this patent is extended or adjusted under 35 U.S.C. 154(b) by 684 days.

(21) Appl. No.: 12/555,164

(22) Filed: Sep. 8, 2009

(65) Prior Publication Data

US 2010/0072179 A1 Mar. 25, 2010

Related U.S. Application Data

(60) Provisional application No. 61/099,710, filed on Sep. 24, 2008.

(51) Int. Cl.
*B23K 26/00* (2006.01)

(52) U.S. Cl. ........... 219/121.6; 219/121.63; 219/121.64; 438/381

(58) Field of Classification Search .................. None
See application file for complete search history.

(56) References Cited

U.S. PATENT DOCUMENTS

| | | | |
|---|---|---|---|
| 3,345,545 A | 10/1967 | Bourgault et al. | |
| 4,085,435 A | 4/1978 | Galvagni | |
| 4,945,452 A | 7/1990 | Sturmer et al. | |
| 5,198,868 A | 3/1993 | Saito et al. | |
| 5,357,399 A | 10/1994 | Salisbury | |
| 5,394,295 A | 2/1995 | Galvagni et al. | |
| 5,495,386 A | 2/1996 | Kulkarni | |
| 5,949,639 A | 9/1999 | Maeda et al. | |
| 6,191,936 B1 | 2/2001 | Webber et al. | |
| 6,197,252 B1 | 3/2001 | Bishop et al. | |
| 6,322,912 B1 | 11/2001 | Fife | |
| 6,519,135 B2 | 2/2003 | Sano et al. | |
| 6,674,635 B1 | 1/2004 | Fife et al. | |
| 6,970,345 B2 | 11/2005 | Oh et al. | |
| 7,116,548 B2 | 10/2006 | Satterfield, Jr. et al. | |
| 7,262,511 B2 | 8/2007 | Osako et al. | |
| 2005/0105248 A1* | 5/2005 | Oh et al. ........................ | 361/523 |
| 2005/0135751 A1* | 6/2005 | Zbinden .......................... | 385/50 |
| 2009/0059477 A1* | 3/2009 | Petrzilek et al. .............. | 361/525 |

FOREIGN PATENT DOCUMENTS

| | | |
|---|---|---|
| CN | 201015817 | 2/2008 |
| GB | 1267377 | 3/1972 |
| JP | 56091994 | 7/1981 |
| JP | 62093092 | 4/1987 |
| JP | 2005014018 | 1/2005 |
| JP | 2007000897 | 1/2007 |

OTHER PUBLICATIONS

UK Search Report for GB0916268.6 dated Nov. 26, 2009, 4 pages.

* cited by examiner

*Primary Examiner* — Benjamin Sandvik
*Assistant Examiner* — Scott R Wilson
(74) *Attorney, Agent, or Firm* — Dority & Manning, P.A.

(57) ABSTRACT

A technique for laser welding an anode lead to an anode termination of an electrolytic capacitor is provided. The technique involves directing a laser beam through one or more refraction elements before it contacts the lead and anode termination. By selectively controlling the index of refraction and thickness of the refraction element, the angle at which the refraction element is positioned relative to the laser beam, etc., the laser beam may be directed to a precise weld location without substantially contacting and damaging other parts of the capacitor.

23 Claims, 3 Drawing Sheets

LASER WELDING OF ELECTROLYTIC CAPACITORS

RELATED APPLICATIONS

The present application claims priority to the provisional patent application having U.S. Ser. No. 61/099,710 filed on Sep. 24, 2008, which is hereby incorporated by reference in its entirety.

BACKGROUND OF THE INVENTION

The diversity of modern technical applications creates a need for efficient electronic components and integrated circuits for use therein. Electrolytic capacitors are a fundamental component used for filtering, decoupling, bypassing and other aspects of such modern applications which may include wireless communications, high-speed processing, networking, circuit switching, and many other applications. A dramatic increase in the speed and packing density of integrated circuits requires advancements in capacitor technology. Many specific aspects of capacitor design have thus been a focus for improving the performance characteristics of capacitors. Solid electrolytic capacitors (e.g., tantalum capacitors) have been a major contributor to the miniaturization of electronic circuits and have made possible the application of such circuits in extreme environments. However, with the miniaturization of capacitors come increased difficulties in production. For instance, laser welding of capacitors becomes more difficult for smaller capacitors, e.g., the laser diameter must be smaller and the precision of the laser placement must be more accurate. Prior welding techniques have utilized mirrors to position the laser in the desired weld areas. Unfortunately, mirror positioning systems lack the desired accuracy and repeatability often needed for small capacitors. Namely, small angles of inclination of the mirror create drastic of the reflected beam. As such, as the size of the capacitor decreases, the accuracy and repeatability of the welding becomes more difficult to maintain.

As such, a need currently exists for an improved laser welding technique for electrolytic capacitors that provides greater accuracy and repeatability.

SUMMARY OF THE INVENTION

In accordance with one embodiment of the present invention, a method for forming an electrolytic capacitor is disclosed. The method comprises positioning an anode lead of an electrolytic capacitor element adjacent to an anode termination. The electrolytic capacitor element comprises an anode, dielectric film, and electrolyte, wherein the anode lead extends outwardly from a surface of the anode. A laser beam is directed through a refraction element to laser weld the anode lead to the anode termination. The refraction element is oriented at an angle of from 0° C. to about 45° relative to an axis that is perpendicular to the direction of the beam. The capacitor element is electrically connected to a cathode termination and the capacitor element is encapsulated within a case so that at least a portion of the anode termination and cathode termination remain exposed.

In accordance with another embodiment of the present invention, a system for attaching an anode termination to an electrolytic capacitor element is disclosed. The system comprises an electrolytic capacitor element comprising an anode, dielectric film, and electrolyte, wherein an anode lead extends outwardly from a surface of the anode; an anode termination; and a laser welding apparatus for electrically connecting the anode termination to the anode lead, wherein the laser welding apparatus includes a laser beam generator for producing a laser beam and a refraction element, wherein the refraction element is oriented at an angle of from 0° C. to about 45° relative to an axis that is perpendicular to the direction the beam.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 2 is a schematic illustration of embodiment of a refraction element that may be employed in the present invention, in which

Figure 1:
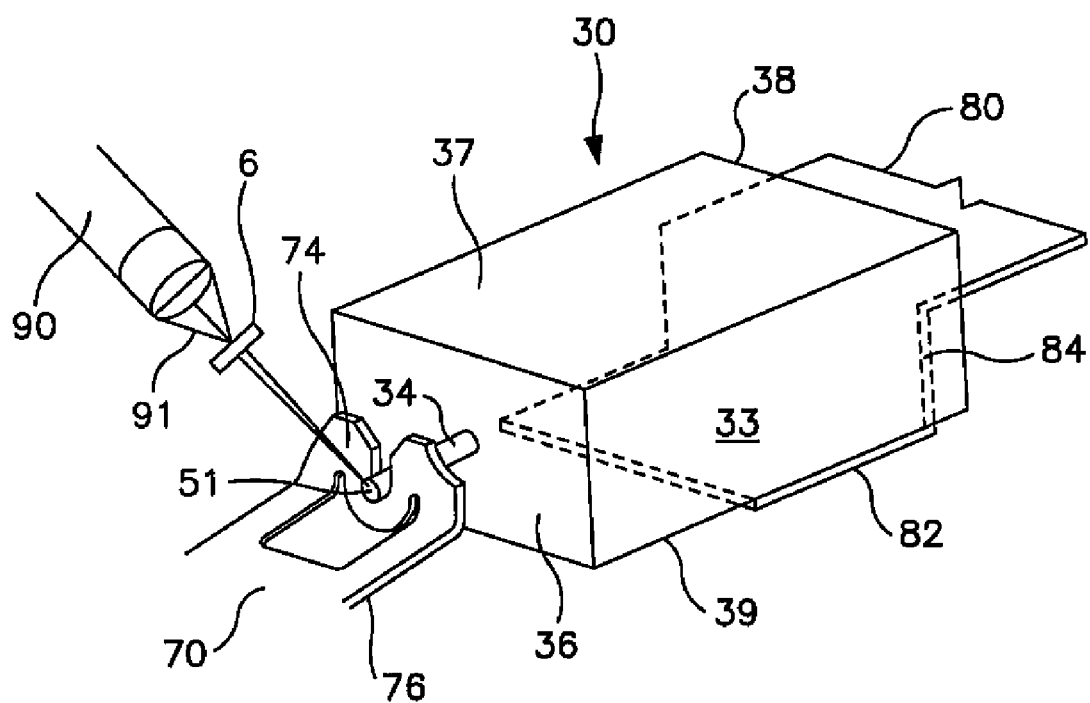
FIG. 1 is a schematic illustration of one embodiment of the present invention for laser welding an electrolytic capacitor.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a technique for laser welding an anode lead to an anode termination of an electrolytic capacitor. The technique involves directing a laser beam through one or more refraction elements before it contacts the lead and anode termination. By selectively controlling the index of refraction and thickness of the refraction element, the angle at which the refraction element is positioned relative to the laser beam, etc., the laser beam may be directed to a precise weld location without substantially contacting and damaging other parts of the capacitor.

Referring to FIG. 1, for example, one embodiment of the laser welding technique of the present invention is schematically illustrated. In this particular embodiment, a capacitor 30 is shown that contains a capacitor element 33, an anode termination 70, and a cathode termination 80. Any conductive material may be employed to form the terminations, such as a conductive metal (e.g., copper, gold, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor assembly. For instance, the thickness of the terminations may range from about 0.05 to about 1 millimeter, in some embodiments from about 0.05 to about 0.5 millimeters, and from about 0.1 to about 0.2 millimeters. One exemplary conductive material is a copper-iron alloy metal plate available from Wieland (Germany).

The capacitor element 33 has a top surface 37, bottom surface 39, front surface 36, and rear surface 38. In this particular embodiment, the cathode termination contains a first portion 82 positioned substantially perpendicular to a second portion 84. The first portion 82 is in electrical contact with the lower surface 39 of the capacitor element 33 and the second portion 84 is in electrical contact with the rear surface 38 of the capacitor element 33. To attach the capacitor element 33 to the cathode termination 80, a conductive adhesive may be employed as is known in the art. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., slime coupling agents). Suitable conductive adhesives are described in U.S. Patent Application Publication No. 2006/0038304 to Osako, et al., which is incorporated herein in its entirety by reference thereto for all purposes.

The anode termination 70 contains a first portion 76 positioned substantially perpendicular to a second portion 74. The second portion 74 contains a region that carries the anode lead 34. Although depicted as being integral, it should be understood that these portions may alternatively be separate pieces that are connected together, either directly or via an additional conductive element (e.g., metal). In the illustrated embodiment, the region 51 possesses a "U-shape" for further enhancing surface contact and mechanical stability of the lead 34.

The anode lead 34 is welded to the anode termination 70 with a laser 90, which produces a beam 91 that passes through a refraction element 6. The refraction element 6 is capable of accurately positioning the beam 91 to a specific location for welding, which in this embodiment is at region 51. In one embodiment, for example, the laser welding system may include a laser that contains a laser beam generator that produces a laser. The type of laser utilized in the present invention may be selected based on the desired function. In one particular embodiment, the laser is one in which the laser medium consists of an aluminum and yttrium garnet (YAG) doped with neodymium (Nd) and the excited particles are neodymium ions $Nd^{3+}$. Such lasers typically emit a light at a wavelength of about 1064 nanometers in the infrared spectrum. The laser may have any diameter suitable for the desired application. In some embodiments, the laser beam in the focused area has a diameter from about 0.05 mm to about 0.5 mm, in some embodiments from about 0.05 mm to about 0.3 mm, and in some embodiments from about 0.1 mm to about 0.15 mm. The laser may also include an optical head (e.g., lens), which as is well known in the art, primarily converges and focuses the laser beam to a focal point. The laser may also include a beam splitter.

Figure 2A:
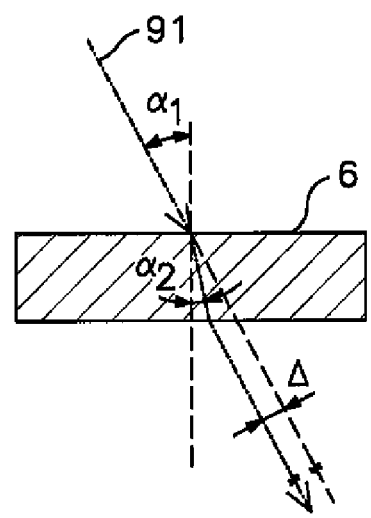
FIG. 2A shows the refraction element positioned normal to the laser beam and FIG. 2B shows the refraction element positioned at an angle relative to the laser beam.

The manner in which the refraction element 6 is able to control the positioning of the beam 91 is shown schematically in FIG. 2A. As shown, the laser beam 91 enters the refraction element 6 at an angle $\alpha_1$. The refraction element 6 directs the beam 91 at an angle of refraction $\alpha_2$, which is determined according to Snell's Law as follows:

$$n_1 * \sin \alpha_1 = n_2 * \sin \alpha_2$$

wherein, $n_1$ and $n_2$ are the indices of refraction of the media through which the light passes. Typically, $n_1$ is air, which has an index of refraction of about 1.

To achieve the desired positioning of the laser beam 91 relative to the weld location, the index of refraction of the refraction element 6 is typically selected to be from about 0.3 to about 5, in some embodiments from about 0.5 to about 3, in some embodiments from about 0.7 to about 2.5, in some embodiments from about 1.0 to about 2.0, in some embodiments from about 1.2 to about 2.0, and in some embodiments from about 1.4 to about 1.8. A variety of materials may be employed for this purpose as is well known in the art. In one particular embodiment, for example, the refraction element 6 may include glass, such as a plan parallel glass (PPG) panel. However, one skilled in the art would readily appreciate that the refraction element could be varied utilizing materials having different indices of refraction to produce the desired index of refraction. For instance, while standard glass typically has an index of refraction of approximately 1.5, colorants, fillers, and other ingredients well known in the art may be incorporated in the glass making process to achieve any desired index of refraction.

The thickness of the refraction element may also be controlled to achieve the desired weld location. For example, the thickness may range from about 0.2 mm to about 10 mm, in some embodiments from about 0.5 mm to about 5 mm, in some embodiments from about 0.7 mm to about 4 mm, and in some embodiments from about 1 mm to about 3 mm.

Figure 2B:
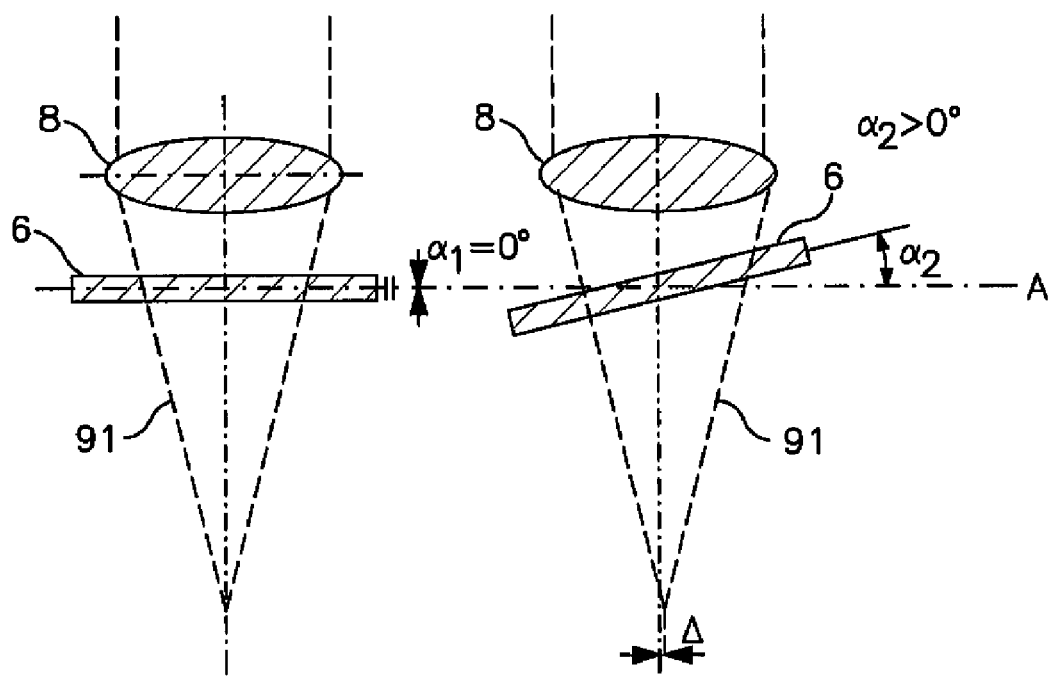

Of course, other parameters may also affect the positioning of the laser beam for welding. For example, the angle at which it is oriented relative to the laser beam may also be selectively controlled to achieve the desired welding. Referring again to FIG. 2B (left side), for example, a laser beam 91 may pass through a lens 8 of a laser (not shown) and be directed through the refraction element 6 at an angle $\alpha_2$. Because the lens 8 is positioned normal to the refraction element 6 ($\alpha_1=0°$), the resulting beam 91 is generally focused at a point centered below the refraction element 6. In certain situations, however, it may be desired to slightly correct the positioning of the laser beam 91 a distance $\Delta$ to direct it to the weld location. In this regard, as shown in FIG. 2B (right side), altering the angle at which the refraction element 6 is positioned ($\alpha_2$, which is >0°) may result in a focused beam 91 that is offset a distance $\Delta$. As angle $\alpha_2$ increases, the position correction $\Delta$ increases. Unlike reflection-based mirror systems, however, the correction distance $\Delta$ is independent from the focal distance. Thus, by simply controlling the orientation of the refraction element 6, the laser beam may be precisely focused on a desired location without moving the laser. In most cases, the angle at which the refraction element is oriented relative to the laser is from about 0° to about 45°, in some embodiments from about 1° to about 30°, in some embodiments from about 2° to about 25°, in some embodiments from about 3° to about 20°, and in some embodiments from about 5° to about 15°. The angle is measured relative to an axis that is perpendicular to the direction of the laser beam. In FIG. 2, for instance, the angle is measured relative to an axis "A" that is perpendicular to a longitudinal axis extending between the lens 8 and the focal point of the beam when the refraction element is parallel to the lens.

The table below lists exemplary distances "$\Delta$" observed with various glass thicknesses, inclined angles, and indices of refraction.

| Inclined Angle | Standard Glass (n = 1.5) thickness (mm) | | | Hybrid Glass (n = 1.7) thickness (mm) | | | Hybrid Glass (n = 1.9) thickness (mm) | | |
|---|---|---|---|---|---|---|---|---|---|
| (°) | 1 | 2 | 3 | 1 | 2 | 3 | 1 | 2 | 3 |
| 5 | 0.029 | 0.058 | 0.087 | 0.036 | 0.072 | 0.108 | 0.041 | 0.083 | 0.124 |
| 10 | 0.058 | 0.116 | 0.174 | 0.073 | 0.145 | 0.218 | 0.083 | 0.166 | 0.249 |
| 15 | 0.089 | 0.178 | 0.267 | 0.267 | 0.220 | 0.330 | 0.126 | 0.252 | 0.378 |

Any number of refraction elements may generally be employed in the laser system of the present invention. In certain embodiments, for example, at least two refraction elements are employed to enhance degree to which the beam may be refracted. The refraction elements may be made from the same or different materials or have the same or different thicknesses. When the laser beam passes generally in the −z direction, one element may be oriented about one axis of the x-y plane (e.g., −x axis). Another element may be oriented about another axis (e.g., −y axis), the same axis (e.g., −x axis), or remain unoriented.

The laser welding system of the present invention may include various components to help improve the accuracy of the weld positioning. During production, for example, variances in the size of the capacitor and the location of terminations, leads, etc. may result in the need for real-time adjustments to the weld location. This may be accomplished by providing real-time control of the refraction elements. In one embodiment, for instance, a camera (e.g., optoelectronic scanning camera) may be employed that is capable of capturing an image of the capacitor (still and/or moving) at a position prior to the weld position (i.e., the scanning position) and electrically communicating the image to an image processing unit (IPU). The IPU may be programmed (e.g., with a look up table, algorithm, etc.) so that upon receiving the image, it can calculate or otherwise determine the angle needed to achieve the desired welding location. The IPU can then send a signal to a drive device (e.g., servo motor, galvo motor, etc.) that adjusts the refraction element as needed. The drive device, for instance, may rotate the refractive element about an axis, such as the −x axis and/or −y axis when the laser beam is traveling essentially in the −z axis.

The laser welding system may also include a transport device (e.g., endless belt or wire) for transporting the capacitor to the laser. Because non-linearities in the movement of the transport device often causes off-center welds, the laser welding system may also include a camera that is positioned above the transport device and located generally at the weld position for capturing an image of the capacitor. The camera may communicate this image with the IPU, which can in turn further calibrate the positioning of the refraction element. This may help reduce defects caused by deviation of the refraction element positioning caused by a variety of factors, such as temperature changes, electric noise, vibrations, etc., and may be used for calibration, service modes, quality check, etc.

Figure 3:
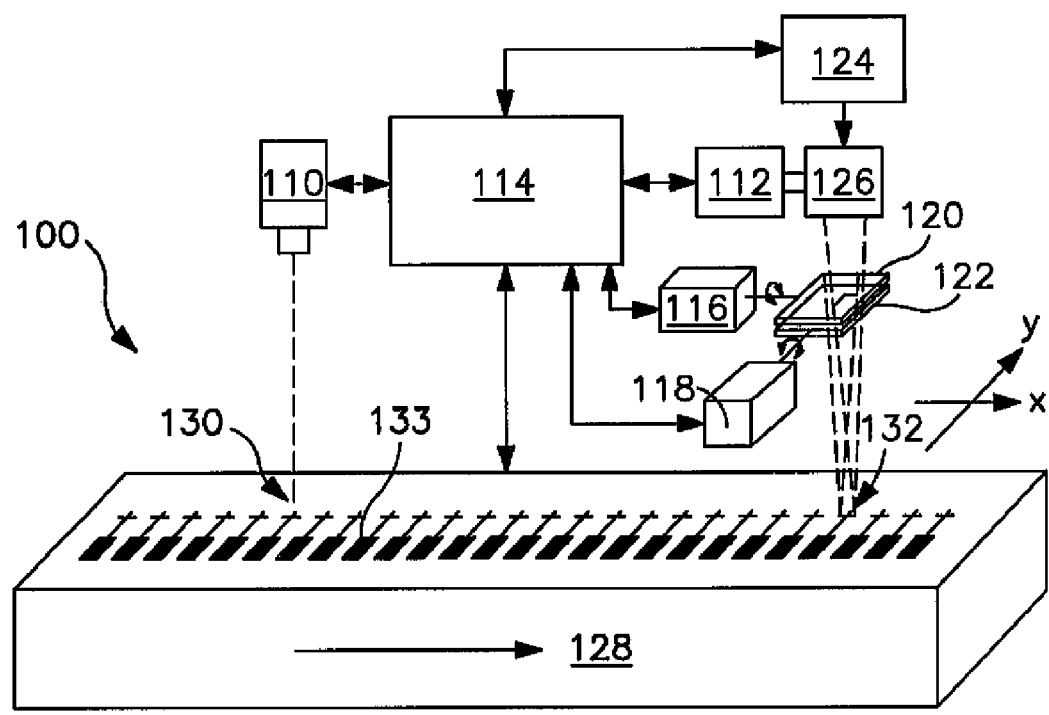
FIG. 3 is a schematic illustration of one embodiment of the laser welding system of the present invention.

Referring to FIG. 3, one particular embodiment of the laser welding system of the present invention is schematically illustrated. As shown, the system 100 includes a transport device 128 for transporting a plurality of electrolytic capacitors 133. In this particular embodiment, the electrolytic capacitors 133 pass under a scanning camera 110 at a scanning position 130, which captures an image of one of the capacitors 133 and communicates the image to an IPU 114. The IPU 114 receives the input image information and controls a first and second driving device 116 and 118 that drive a pair of laser refraction elements 120 and 122, respectively. For example, the first driving device 116 may rotate the first refraction element 120 about one axis (e.g., x-axis) and the second driving device 118 may rotate the second refraction element 122 about the same or a different axis (e.g., y-axis). At a predetermined position after a scanning position 130 (i.e., the weld position 132), a welding system engages. The welding system comprises a laser generator 124 and an optical head 126 (e.g., lens). After exiting the optical head 126, the laser beam passes through the laser refraction elements 120 and 122. The laser refraction elements 120 and 122, positioned by their respective driving devices 116 and 118, refract the laser to the desired weld position on the capacitor 133.

In the illustrated embodiment, a feedback camera 112 is also positioned above the transport device 128 and located generally at the weld position 132. The feedback camera 112 may be utilized to capture a second image of the electrical component at the weld position 132. The IPU 114, also in electric communication with the feedback camera 112, receives the second image and may calibrate the positioning of the refraction elements 120 and 122 if the position of the electrical component has deviated from the position recorded upstream by the scanning camera.

Any electrolytic capacitor may generally be laser welded in accordance with the present invention. For example, the capacitor typically contains an anode formed from a valve metal composition. The valve metal composition may have a high specific charge, such as about 60,000 microFarads*Volts per gram ("µF*V/g") or more, in some embodiments about 70,000 µF*V/g or more, in some embodiments about 100,000 µF*V/g or more, and in some embodiments, about 150,000 µF*V/g or more. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the anode may be formed from a valve metal oxide having an atomic ratio of metal to oxygen of 1:less than 2.5, in some embodiments 1:less than 2.0, in some embodiments 1:less than 1.5, and in some embodiments, 1:1. Examples of such valve metal oxides may include niobium oxide (e.g., NbO), tantalum oxide, etc., and are described in more detail in U.S. Pat. No. 6,322,912 to Fife, which is incorporated herein in its entirety by reference thereto for all purposes.

Conventional fabricating procedures may generally be utilized to form the anode. In one embodiment, a tantalum or niobium oxide powder having a certain particle size is first selected. The particle size may vary depending on the desired voltage of the resulting capacitor. For example, powders with a relatively large particle size (e.g., about 10 micrometers) are often used to produce high voltage capacitors, while powders with a relatively small particle size (e.g., about 0.5 micrometers) are often used to produce low voltage capacitors. The particles are then optionally mixed with a binder and/or lubricant to ensure that the particles adequately adhere to each other when pressed to form the anode. Suitable binders may include camphor, stearic and other soapy fatty acids, Carbowax (Union Carbide), Glyptal (General Electric), polyvinyl alcohols, naphthalene, vegetable wax, and microwaxes (purified paraffins). The binder may be dissolved and dispersed in a solvent. Exemplary solvents may include water; acetone; methyl isobutyl ketone; trichloromethane; fluorinated hydrocarbons (freon) (DuPont); alcohols; and chlorinated hydrocarbons (carbon tetrachloride). When utilized, the percentage of binders and/or lubricants may vary from about 0.1% to about 8% by weight of the total mass. It should be understood, however, that binders and lubricants are not required in the present invention. Once formed, the powder is compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around the anode lead (e.g., tantalum wire). It should be further appreciated that the anode lead may alternatively be attached (e.g., welded) to the anode subsequent to pressing and/or sintering of the anode.

After compression, any binder/lubricant may be removed by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the pellet is sintered to form a porous, integral mass. For example, in one embodiment, the pellet may be sintered at a temperature of from about 1200° C. to about 2000° C., and in some embodiments, from about 1500° C. to about 1800° C. under vacuum. Upon sintering, the pellet shrinks due to the growth of bonds between the particles. In addition to the techniques described above, any other technique for forming the anode may also be utilized in accordance with the present invention, such as described in U.S. Pat. No. 4,085,435 to Galvagni; U.S. Pat. No. 4,945,452 to Sturmer, et al.; U.S. Pat. No. 5,198,968 to Galvagni; U.S. Pat. No. 5,357,399 to Salisbury; U.S. Pat. No. 5,394,295 to Galvagni, et al.; U.S. Pat. No. 5,495,386 to Kulkarni; and U.S. Pat. No. 6,322,912 to Fife, which are incorporated herein in their entirety by reference thereto for all purposes.

Regardless of the particular manner in which it is form, the thickness of the anode is selected in accordance with the present invention to improve the electrical performance of the capacitor assembly. For example, the thickness of the anode (in the −z direction in FIG. 1) may range from about 4 millimeters or less, in some embodiments, from about 0.2 to about 3 millimeters, and in some embodiments, from about 0.4 to about 1 millimeter. Such a relatively small anode thickness (i.e., "low profile") helps dissipate heat generated by the high specific charge powder and also provide a shorter transmission path to minimize ESR and inductance. The shape of the anode may also be selected to improve the electrical properties of the resulting capacitor. For example, the anode may have a shape that is curved, sinusoidal, rectangular, U-shaped, V-shaped, etc. The anode may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

The anode may be anodized so that a dielectric film is formed over and within the porous anode. Anodization is an electrical chemical process by which the anode metal is oxidized to form a material having a relatively high dielectric constant. For example, a tantalum anode may be anodized to form tantalum pentoxide ($Ta_2O_5$), which has a dielectric constant "k" of about 27. The anode may be dipped into a weak acid solution (e.g., phosphoric acid) at an elevated temperature (e.g., about 85° C.) that is supplied with a controlled amount of voltage and current to form a tantalum pentoxide coating having a certain thickness. The power supply is initially kept at a constant current until the required formation voltage is reached. Thereafter, the power supply is kept at a constant voltage to ensure that the desired dielectric quality is formed over the surface of the tantalum pellet. The anodization voltage typically ranges from about 5 to about 200 volts, and in some embodiments, from about 20 to about 100 volts. In addition to being formed on the surface of the anode, a portion of the dielectric oxide film will also typically form on the surfaces of the pores. It should be understood that the dielectric film may be formed from other types of materials and using different techniques.

Once the dielectric film is formed, a protective coating may optionally be applied, such as one made of a relatively insulative resinous material (natural or synthetic). Such materials may have a resistivity of greater than about 0.05 ohm-cm, in some embodiments greater than about 5, in some embodiments greater than about 1,000 ohm-cm, in some embodiments greater than about $1\times10^5$ ohm-cm, and in some embodiments, greater than about $1\times10^{10}$ ohm-cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The anodized part is thereafter subjected to a step for forming solid electrolytes, which acts as the true cathode of the capacitor. The electrolyte may be formed by pyrolytic decomposition of manganous nitrate ($Mn(NO_3)_2$) to form a manganese dioxide ($MnO_2$) cathode. Such techniques are described, for instance, in U.S. Pat. No. 4,945,452 to Sturmer, et al., which is incorporated herein in its entirety by reference thereto for all purposes. Alternatively, a conductive polymer coating may be used to form the solid electrolyte. The conductive polymer coating may contain one or more conductive polymers, such as polypyrroles; polythiophenes, such as poly (3,4-ethylenedioxy thiophene) (PEDT); polyanilines; poly-acetylenes; poly-p-phenylenes; and derivatives thereof. Moreover, if desired, the conductive polymer coating may also be formed from multiple conductive polymer layers. For example, in one embodiment, the conductive polymer coating may contain one layer formed from PEDT and another layer formed from a polypyrrole. Various methods may be utilized to apply the conductive polymer coating onto the anode part. For instance, conventional techniques such as electropolymerization, screen-printing, dipping, electrophoretic coating, and spraying, may be used to form a conductive polymer coating. In one embodiment, for example, the monomer(s) used to form the conductive polymer (e.g., 3,4-ethylenedioxy thiophene), may initially be mixed with a polymerization catalyst to form a solution. For example, one suitable polymerization catalyst is BAYTRON C, which is iron III toluene-sulphonate and n-butanol and sold by Bayer Corporation. BAYTRON C is a commercially available catalyst for BAYTRON M, which is 3,4-ethylene dioxythiophene, a PEDT monomer also sold by Bayer Corporation. In most embodiments, once applied, the conductive polymer is healed. Healing may occur after each application of a conductive polymer layer or may occur after the application of the entire conductive polymer coating. Although various methods have been described above, it should be understood that any other method for applying the electrolyte may also be utilized in the present invention.

Once the solid electrolyte is formed, the part may then be applied with a carbon coating (e.g., graphite) and silver coating, respectively. The silver coating may, for instance, act as a solderable conductor, contact layer, and/or charge collector for the capacitor element and the carbon coating may limit contact of the silver coating with the solid electrolyte.

Once the capacitor element is attached to the terminations, it is enclosed within a resin casing, which may then be filled with silica or any other known encapsulating material. The width and length of the case may vary depending on the intended application. However, the overall thickness of the casing is typically small so that the resultant assembly may be readily incorporated into low profile products (e.g., "IC cards"). For example, the thickness of the casing may range from about 4.0 millimeters or less, in some embodiments, from about 0.1 to about 2.5 millimeters, and in some embodiments, from about 0.15 to about 2.0 millimeters. Suitable casings may include, for instance, "A", "B", "F", "G", "H", "J", "K", "P", "R", "S", "T", "W", "Y", or "X" cases (AVX Corporation). In one particular embodiment, the casing is a "J" case. After encapsulation, exposed portions of the respective anode and cathode terminations may be aged, screened, and trimmed. If desired, the exposed portions may be optionally bent twice along the outside of the casing (e.g., at an approximately 90° angle).

Due to the control of the weld location in accordance with the present invention, damage to the capacitor may be minimized during laser welding. This results in a capacitor having excellent electrical properties. For instance, the capacitor may exhibit a low equivalent series resistance (ESR), which refers to the extent that the capacitor has resistance in series with capacitance, which delays charging and discharging and causes losses in electronic circuit. The ESR may, for example, be less than about 200 milliohms, in some embodiments less than about 100 milliohms, and in some embodiments, less than about 40 milliohms, measured with a 2-volt bias and 1-volt signal at a frequency of 100 kHz. The capacitance of the capacitor may also range from about 0.1 to about 4,000 microFarads, in some embodiments, from about 10 to about 2,000 microFarads, in some embodiments, from about 100 to about 1,000 microFarads, measured at a frequency of 120 Hz.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method for forming an electrolytic capacitor, the method comprising:
   positioning an anode lead of an electrolytic capacitor element adjacent to an anode termination, the electrolytic capacitor element comprising an anode, dielectric film, and electrolyte, wherein the anode lead extends outwardly from a surface of the anode;
   directing a laser beam through two or more refraction elements to laser weld the anode lead to the anode termination, wherein at least one of the refraction elements is oriented at an angle of from 0° C. to about 45° relative to an axis that is perpendicular to the direction of the beam;
   electrically connecting the capacitor element to a cathode termination; and
   encapsulating the capacitor element within a case so that at least a portion of the anode termination and cathode termination remain exposed.

2. The method of claim 1, wherein the two or more refraction elements include glass.

3. The method of claim 1, wherein the two or more refraction elements each have an index of refraction of from about 1.2 to about 2.0.

4. The method of claim 1, wherein the two or more refraction elements are plan parallel glass panels.

5. The method of claim 1, wherein the refraction elements each have a thickness of from about 0.7 to about 4 millimeters.

6. The method of claim 1, wherein the laser beam passes through a lens before being directed through the refraction elements.

7. The method of claim 1, wherein the anode includes tantalum, niobium, or an electrically conductive oxide thereof.

8. The method of claim 1, wherein the electrolyte is a solid and includes manganese dioxide, a conductive polymer, or a combination thereof.

9. The method of claim 1, further comprising capturing an image of the capacitor element prior to laser welding and transmitting the image to an image processing unit.

10. The method of claim 9, wherein the image processing unit electrically communicates with a drive device that is configured to adjust the orientation of the refraction elements.

11. The method of claim 9, wherein the image is captured by an optoelectronic camera.

12. The method of claim 9, wherein the image is captured at a position adjacent to the anode termination.

13. The method of claim 1, wherein the laser beam is oriented primarily in the −z direction, and further wherein the refraction elements are oriented about the −x axis, the −y axis, or both.

14. The system of claim 1, wherein the case has a thickness of from about 0.2 millimeters to about 1.0 millimeters.

15. A system for attaching an anode termination to an electrolytic capacitor element, the system comprising:
   an electrolytic capacitor element comprising an anode, dielectric film, and electrolyte, wherein an anode lead extends outwardly from a surface of the anode;
   an anode termination;
   a laser welding apparatus for electrically connecting the anode termination to the anode lead, wherein the laser welding apparatus includes a laser beam generator for producing a laser beam and a refraction element, wherein the refraction element is oriented at an angle of from 0° C. to about 45° relative to an axis that is perpendicular to the direction the beam; and
   a camera for capturing an image of the capacitor prior to laser welding, during laser welding, or both.

16. The system of claim 15, wherein the refraction element includes glass.

17. The system of claim 15, wherein the refraction element has an index of refraction of from about 1.2 to about 2.0.

18. The system of claim 15, wherein the laser apparatus further comprises a lens through which the laser beam passes prior to the refraction element.

19. The system of claim 15, wherein the laser apparatus comprises two or more refraction elements.

20. The system of claim 15, wherein the anode includes tantalum, niobium, or an electrically conductive oxide thereof.

21. The system of claim 15, wherein the camera is in electrical communication with an image processing unit.

22. The system of claim 21, wherein the image processing unit electrically communicates with a drive device that is configured to adjust the orientation of the refraction element.

23. The system of claim 22, wherein the drive device includes a servo motor, galvo motor, or a combination thereof.

* * * * *

UNITED STATES PATENT AND TRADEMARK OFFICE
CERTIFICATE OF CORRECTION

PATENT NO. : 8,344,282 B2
APPLICATION NO. : 12/555164
DATED : January 1, 2013
INVENTOR(S) : Leos Dvorak et al.

Page 1 of 1

It is certified that error appears in the above-identified patent and that said Letters Patent is hereby corrected as shown below:

In the Claims:

In Claim 1 (column 9, line 57)

"...is oriented at an angle of from 0°C. to about 45° relative..." should read --...is oriented at an angle of from 0° to about 45° relative...--

In Claim 15 (column 10, line 42)

"...from 0°C. to about 45° relative to an axis that is perpen-..." should read --...from 0° to about 45° relative to an axis that is perpen-...--

In Claim 15 (column 10, line 43)

"...dicular to the direction the beam; and..." should read --...dicular to the direction of the beam; and...--

Signed and Sealed this
Twenty-ninth Day of July, 2014

Michelle K. Lee
*Deputy Director of the United States Patent and Trademark Office*